7784X
W. Barrett.
Evaporating Pan.
Patented Nov. 19, 1833.
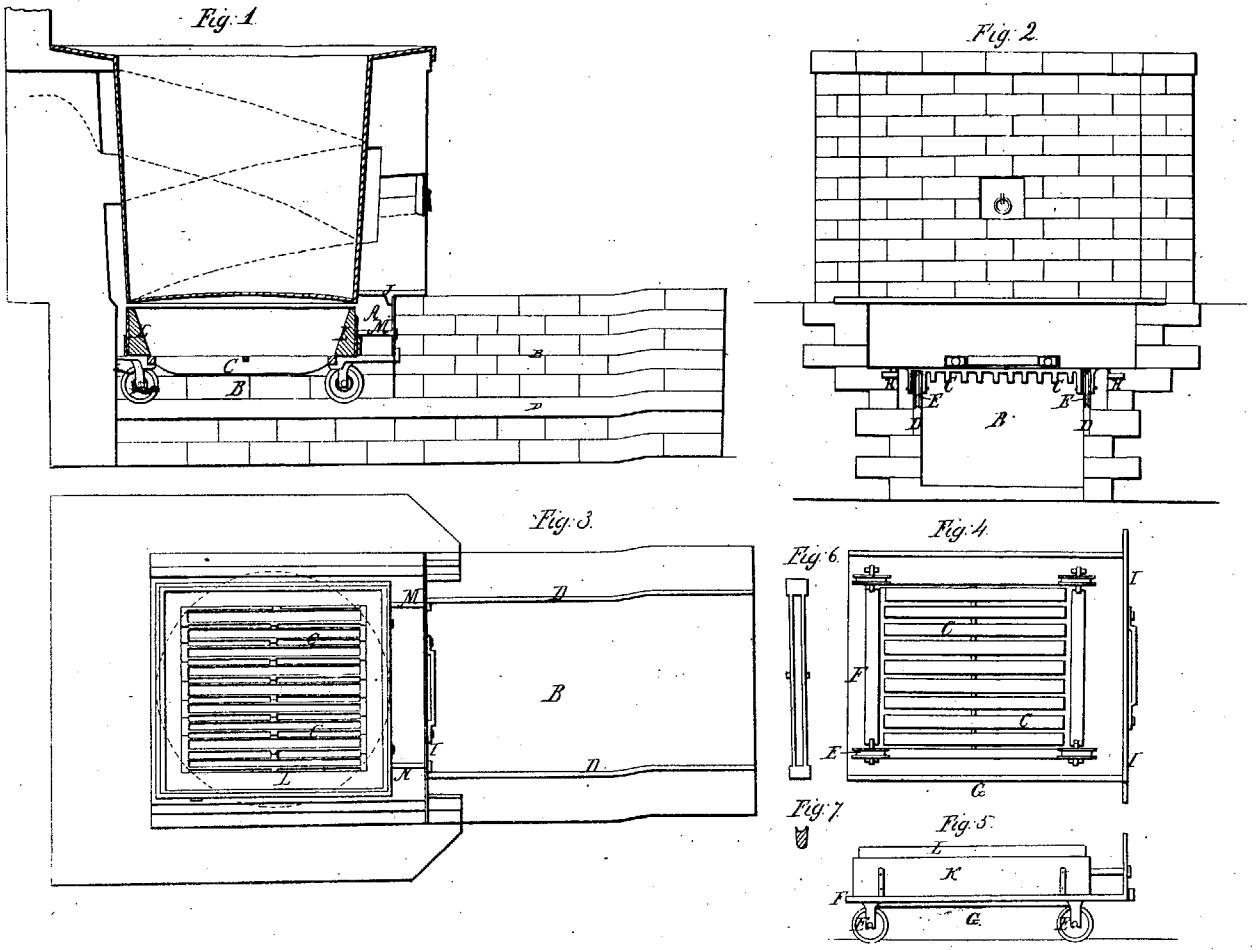

Nov 19 1833 . Ar 13

7784X William Barrett Nov 19, 1833

Letters Patent

The Schedule referred to in these Letters Patent and making part of
the same containing a description in the words of the said William Bar-
rett himself of his Improvement in Furnaces for burning Anthracite
coal for heating & evaporating Liquids.

---

To all whom it may concern. Be it known that I William Barrett of
Malden in the County of Middlesex and State of Massachusetts have inven-
ted certain improvements in furnaces for the purpose of burning the different
varieties of Anthracite coal and applying the heat from the same to the heat-
ing of vessels used for the purpose of Dying, Distilling, Brewing, soap-making,
generating Steam and in general wherever it is required to heat or to evap-
orate fluids of any kind by which inventions or improvements I save to a con-
siderable extent the expense of fuel and the time required for attendance on
the fire, effect a more rapid heating of the fluid by a more immediate approx-
imation of the fire to the bottom of the containing vessel and withdraw or ap-
ply the fire with greater facility than by any of the methods heretofore
known; preserve the grate bars from the effects of the intense heat of the fur-
nace and obtain other advantages. The grate with its appendages which
is used for sustaining the fuel is made to run upon a rail-way by means
of iron trucks or rollers, from which circumstance I denominate the furnace
the "railway furnace" and I do hereby declare that the following is a full
and exact description of the construction thereof, reference being had to the
drawings which accompany and make a part of this specification. Fig 1 is
a sectional view of the furnace cut vertically from front to back. Fig 2 is
a vertical transverse section thereof. Fig. 3 is a horizontal section or plan with
a boiler and [illegible] [illegible] which surrounds it removed leaving the furnace
and its immediate appendages in view. Fig 4 shows the under side of the
Grate, its frame and trucks, or Rollers upon which it runs. Fig 5 is a side
view of the same. Fig 6 the upper surface of one of the bars. Fig 7 is a trans-
verse section of the same. In referring to the respective figures I shall [illegible]

Bar

7784X of them represent the corresponding parts of the same letter A. Fig. 1 is the boil-
er surrounded by the stack, flue and other appendages the form of which
however will be dependent upon the nature of the business to be performed.
B is the Ash Pit within which is contained the furnace and the rails upon
which it is to run. C is the bars of the grate made of cast iron. D the rails up-
on which they run. E the trucks or rollers grooved to keep them in their
places, both these latter parts also being usually made of cast iron. F. Fig. 4
shews the cast iron frame of the furnace upon which projecting pieces are cast to receive the
trucks and at the sides E. there is a flanch or fillet along its whole length
projecting downwards, these pass over two corresponding pieces fixed in the
manner of the rails immediately under the furnace and firmly attached
to the masonry by dogs or projecting pieces of wrought iron built into it.
This arrangement is shown at H. Fig. 2. it serves to secure and direct the
current of air through the openings between the bars by preventing its es-
cape laterally. These flanches or fillets are made to pass near to but not to
touch each other and do not therefore offer any obstruction to the travers-
ing of the furnace. To secure a sufficient degree of strength in the cast iron
frame which contains the grate bars it is made in one entire piece with
[illegible] for the reception of the Grate Bars. It is also made of greater thick-
ness where it approaches the bars than elsewhere. What I denominate the
"door plate" of the furnace and which is intended to prevent the entrance of air
above the fuel when the furnace is in its place I ordinarily make of a thick
plate of sheet iron. The lower edge of this plate fits on to the front edge of
the cast iron frame of the furnace to which it is firmly attached and its
upper edge shuts closely against a fillet or ledge on the lower side of a cast
iron "covering plate" upon which plate the Masonry is carried over the fur-
nace in constructing the stack and flue around the boiler. The manner in
which the door plate shuts may be seen by inspecting that part of it represent-
ed in the drawing fig. 1. A ledge or square frame of thick sheet iron K. fig. 5 is
[illegible] upon and attached to the furnace frame. This serves to receive the lin-
ing of Soap Stone or other bad conductor of heat. To [illegible] or otherwise made
into the proper shape for the place it is to occupy. To this sheet iron frame as
well as to the cast iron frame of the furnace I attach the iron plate by means of

7784X of bolts seen at M. keeping it at such distance from the fuel as may be found convenient or necessary) this being regulated by the width of the cast iron frame. The grate bars fig. 6. I cast with a groove or channel along them making this groove about three fourths of an inch deep through its entire length The section fig. 7. shews the general form of the bar. Projections at the ends and at the middle of each bar made in the ordinary form serve to keep them when in their places at regular distances from each other. The before named grooves in the bars protects them from injury by the intense heat of the fuel, which it does not only by diminishing the points of contact with it but also by retaining ashes upon each bar which is a bad conductor of heat. I have thus described the construction of my furnace such as I have it in actual use and the drawings thereof which are hereunto attached I have made to a scale of one inch and a half to the foot taking said furnace for my guide. It will be manifest however that it may not only be varied in size but that the parts may in many instances be differently arranged whilst the prin-ciple of construction remains unchanged. I do not intend therefore by this description to confine myself in either of these particulars but to make such variations therein as experience or convenience may dictate. What I claim as new in the furnace herein described is that arrangement thereof by which I am enabled to bring the burning fuel, anthracite, much nearer to the bottom of the vessel to be heated than can be effected by any of the ordinary modes of construction. namely by making the furnace in the general form described and running the same upon a rail way; I do not claim as my invention the mere running of a furnace upon a railway this having been before done or proposed to be done in fire places of a certain description. But I claim it only in combination with the kind of furnace which I have described. I also claim the manner of drawing and directing the draft between the grate bars by means of the ledges, flanches or fillets at each side of and beneath the frame of the furnace. I likewise claim the particu-lar construction of the grate bars grooved on their upper sides in the man-ner and for the purpose above set forth Witnesses { Geo. [illegible]
Albert [illegible] (In [illegible])

William Barnett [illegible]

[illegible]

1316 [illegible]